(12) United States Patent
Ishikawa et al.

(10) Patent No.: US 9,565,417 B2
(45) Date of Patent: Feb. 7, 2017

(54) IMAGE PROCESSING METHOD, IMAGE PROCESSING DEVICE, AND ELECTRONIC DEVICE

(71) Applicant: Sony Corporation, Tokyo (JP)

(72) Inventors: Takanori Ishikawa, Saitama (JP); Yasuhide Hyodo, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/612,519

(22) Filed: Feb. 3, 2015

(65) Prior Publication Data
US 2015/0229904 A1 Aug. 13, 2015

(30) Foreign Application Priority Data

Feb. 10, 2014 (JP) ................. 2014-023608

(51) Int. Cl.
*G06K 9/00* (2006.01)
*H04N 13/00* (2006.01)
*H04N 13/04* (2006.01)

(52) U.S. Cl.
CPC ...... *H04N 13/0022* (2013.01); *H04N 13/0484* (2013.01); *G06K 9/00* (2013.01)

(58) Field of Classification Search
CPC .............. H04N 2013/0081; H04N 13/0239; H04N 19/174; H04N 13/0468; H04N 13/0484; H04N 13/0242; H04N 13/0022; H04N 13/0253; H04N 13/0271; H04N 9/87; H04N 21/4728; H04N 21/6587; H04N 13/0018; G06T 2207/10012; G06T 7/0075; G06T 7/0081; G06T 7/0065; G06T 2207/10021; G06T 2207/10028; G06T 7/0022; G06T 11/00; G06T 7/00; G06T 7/40; G06T 7/86; G06T 2207/20228; G06T 2207/10024; G06T 19/00; G06T 2207/10152; G06K 9/6202; G06K 9/00711; G06K 9/4671; G06K 9/3241; G06K 2209/23; G06K 9/4676; A61B 6/022; G06F 3/04815; G06F 17/30247; G06F 3/0481
USPC ....... 382/103, 106, 107, 154, 199, 294, 295; 348/42, 43, 47, 50
See application file for complete search history.

(56) References Cited

U.S. PATENT DOCUMENTS

| | | | | |
|---|---|---|---|---|
| 2004/0233275 | A1* | 11/2004 | Tomita | G02B 27/0093 348/51 |
| 2010/0002073 | A1* | 1/2010 | Robinson | H04N 13/0018 348/42 |
| 2012/0008855 | A1* | 1/2012 | Hirai | H04N 13/0014 382/154 |

(Continued)

FOREIGN PATENT DOCUMENTS

JP 2010-529521 A 8/2010

*Primary Examiner* — Vu Le
*Assistant Examiner* — Aklilu Woldemariam
(74) *Attorney, Agent, or Firm* — Wolf, Greenfield & Sacks, P.C.

(57) ABSTRACT

There is provided an image processing method including acquiring a degree of attention of a viewer to a stereoscopic input image, acquiring a relation between the degree of attention and a disparity value for stereovision from each pixel of the input image, and weighting a disparity value of a pixel having the high degree of attention on the basis of the relation between the degree of attention and the disparity value, and increasing the disparity value of the pixel having the high degree of attention.

7 Claims, 8 Drawing Sheets

(56) References Cited

U.S. PATENT DOCUMENTS

| | | | |
|---|---|---|---|
| 2012/0014590 A1* | 1/2012 | Martinez-Bauza | G06T 7/0022 382/154 |
| 2012/0044246 A1* | 2/2012 | Morifuji | G06T 7/0022 345/419 |
| 2012/0148147 A1* | 6/2012 | Ogata | H04N 13/0022 382/154 |
| 2012/0321171 A1* | 12/2012 | Ito | H04N 13/0011 382/154 |
| 2013/0050413 A1* | 2/2013 | Tsukamoto | H04N 13/0018 348/42 |
| 2013/0076749 A1* | 3/2013 | Maeda | G06T 15/08 345/424 |
| 2013/0106844 A1* | 5/2013 | Hong | H04N 13/0022 345/419 |
| 2013/0129194 A1* | 5/2013 | Gusis | G06T 5/50 382/154 |
| 2013/0182945 A1* | 7/2013 | Kim | G06T 15/00 382/154 |
| 2013/0287291 A1* | 10/2013 | Cho | G06K 9/46 382/154 |
| 2013/0329015 A1* | 12/2013 | Pulli | G06T 7/0075 348/47 |
| 2014/0064608 A1* | 3/2014 | Kim | G06K 9/00201 382/154 |
| 2014/0198977 A1* | 7/2014 | Narasimha | G06T 5/007 382/154 |
| 2015/0294470 A1* | 10/2015 | Te | H04N 13/0022 382/154 |

\* cited by examiner

IMAGE PROCESSING METHOD, IMAGE PROCESSING DEVICE, AND ELECTRONIC DEVICE

CROSS REFERENCE TO RELATED APPLICATIONS

This application claims the benefit of Japanese Priority Patent Application JP 2014-023608 filed Feb. 10, 2014, the entire contents of which are incorporated herein by reference.

BACKGROUND

The present disclosure relates to an image processing method, an image processing device, and an electronic device.

In recent years, stereoscopic display device that can stereoscopically display content have become widespread. In such stereoscopic display device, images for the right eye and images for the left eye are displayed on a display while being deviated from each other in the horizontal direction, a disparity amount is adjusted to the extent of the deviation, and accordingly, content is displayed at an arbitrary distance in a depth direction.

For example, as described in JP2010-529521T, a technology for efficiently using a disparity display range in front or back of a display screen in a case where disparity distribution is biased toward one side with respect to the display screen is known. In this technology, histogram smoothing (histogram equalization) which is widely used as a technology for enhancing contrast of an image is performed on a display map, and layout of the disparity is converted in a manner that the bias of the distribution is reduced in a limited disparity range.

SUMMARY

However, a disparity of content is uniformly converted by using the technology described in JP2010-529521T. Accordingly, disparity distribution of an object (for example, person's face) to which a viewer tends to pay attention is not necessarily widened. That is, even if the technology of JP2010-529521T is directly is applied, a disparity in a range (range having a high degree of attention or having high attractiveness) which tends to attract viewer's attention is crushed, and it is difficult for the viewer to view a natural and comfortable stereoscopic image.

Accordingly, it is desired to emphasize a stereoscopic effect of the region to which the viewer pays attention, when the stereoscopic image is displayed.

According to an embodiment of the present disclosure, there is provided an image processing method including acquiring a degree of attention of a viewer to a stereoscopic input image, acquiring a relation between the degree of attention and a disparity value for stereovision from each pixel of the input image, and weighting a disparity value of a pixel having the high degree of attention on the basis of the relation between the degree of attention and the disparity value, and increasing the disparity value of the pixel having the high degree of attention.

A conversion table may be generated for converting an input disparity value into an output disparity value by the weighting, and the disparity value of the pixel having the high degree of attention may be increased in accordance with the conversion table.

A histogram of the degree of attention depending on the disparity value may be acquired as the relation between the degree of attention and the disparity value.

A weighted histogram may be generated by performing the weighting in an area including a disparity value having the peak degree of attention and by multiplying the degree of attention in the area by gain in the histogram. The conversion table may be generated by performing histogram equalization on the weighted histogram.

The weighting may be performed by increasing a slope of the output disparity value to the input disparity value in the conversion table, with regard to an area including a disparity value having the peak degree of attention in the histogram.

The degree of attention of the viewer to the input image may be acquired on the basis of an image characteristic feature of the input image.

The degree of attention of the viewer to the input image may be acquired on the basis of a direction of gaze of the viewer who views the input image.

According to another embodiment of the present disclosure, there is provided an image processing device including a degree-of-attention acquiring unit configured to acquire a degree of attention of a viewer to a stereoscopic input image, an analysis unit configured to acquire a relation between the degree of attention and a disparity value for stereovision from each pixel of the input image, and a disparity increasing unit configured to weight a disparity value of a pixel having the high degree of attention on the basis of the relation between the degree of attention and the disparity value, and configured to increase the disparity value of the pixel having the highest degree of attention.

According to another embodiment of the present disclosure, there is provided an electronic device including a degree-of-attention acquiring unit configured to acquire a degree of attention of a viewer to a stereoscopic input image, an analysis unit configured to acquire a relation between the degree of attention and a disparity value for stereovision from each pixel of the input image, a disparity increasing unit configured to weight a disparity value of a pixel having the high degree of attention on the basis of the relation between the degree of attention and the disparity value, and configured to increase the disparity value of the pixel having the highest degree of attention, and a display unit configured to display a stereoscopic image on the basis of the disparity value increased by the disparity increasing unit.

According to one or more of embodiments of the present disclosure as described above, it is possible to emphasize a stereoscopic effect of the region to which the viewer pays attention. Note that the present disclosure is not limited to the effect stated above and in addition to or in place of the effect stated above, may achieve any of the effects indicated in this specification or effects that can be understood from the specification.

DETAILED DESCRIPTION OF THE EMBODIMENT(S)

Figure 1:
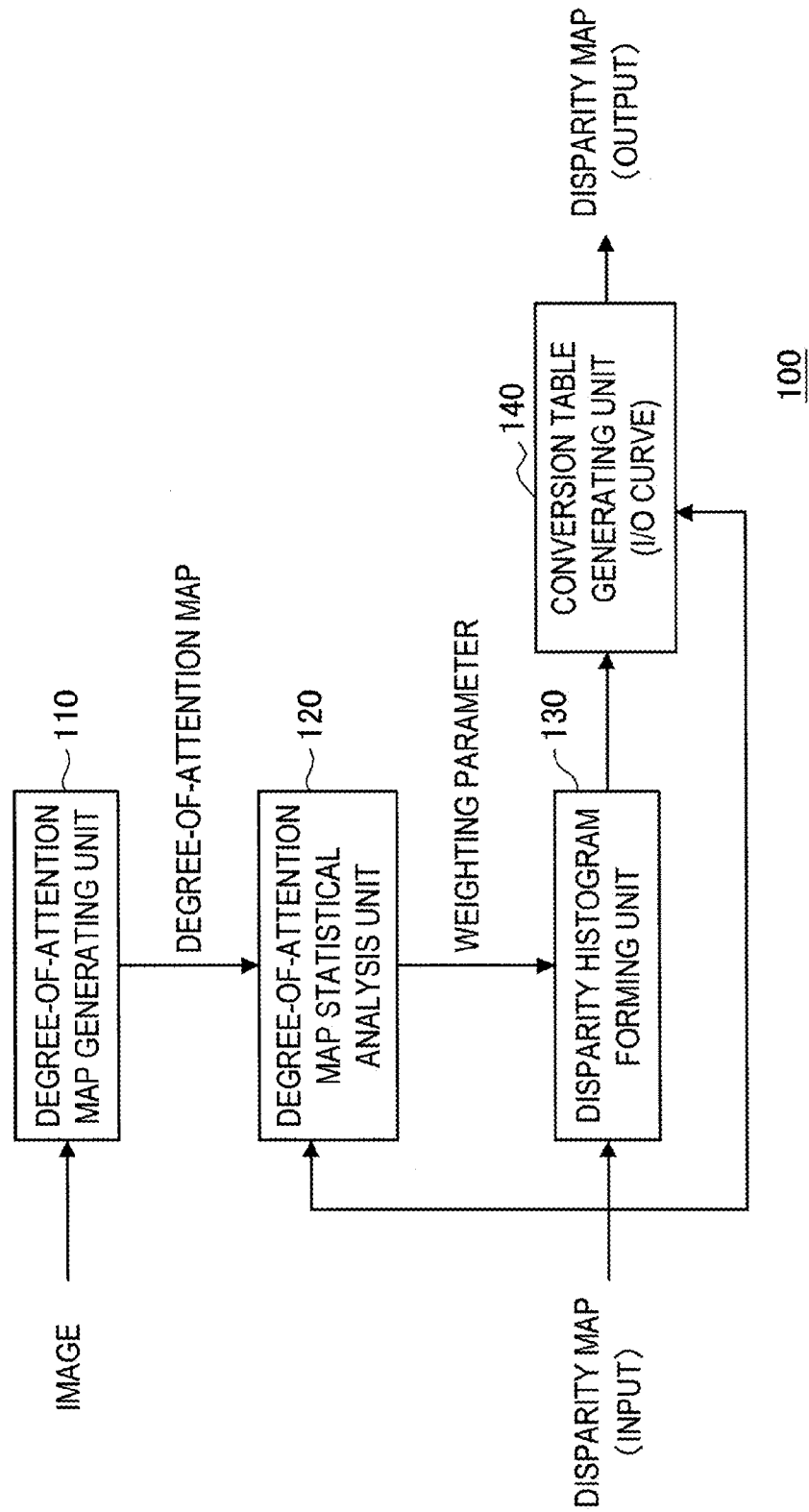
FIG. 1 is a schematic diagram showing a configuration of an image processing device according to a first embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description is given in the following order.
1. First Embodiment
1.1. Configuration Example of Image Processing Device
1.2. Example of Disparity Conversion Table
1.3. Example of Degree-of-Attention Histogram having a plurality of Maxima
2. Second Embodiment
2.1. Configuration Example of Image Processing Device
3. Third Embodiment
3.1. Configuration Example of Image Processing Device
3.2. Example of Disparity Conversion Table

1. First Embodiment

1.1. Configuration Example of Image Processing Device

First, with reference to FIG. 1, a configuration of an image processing device 100 according to a first embodiment of the present disclosure is explained. As shown in FIG. 1, the image processing device 100 according to the embodiment includes a degree-of-attention (saliency) map generating unit 110, a degree-of-attention map statistical analysis unit 120, a disparity histogram forming unit 130, and a conversion table generating unit 140.

Information on an input image is input to the degree-of-attention map generating unit 110. In each embodiment of the present disclosure, the input image is a stereoscopic image, and disparity corresponding to a depth position in the image is set. In the stereoscopic display device, images for the right eye and images for the left eye are displayed on a display while being deviated from each other in the horizontal direction, a disparity amount is adjusted to the extent of the deviation, and accordingly, content is displayed at an arbitrary distance in a depth direction. The image processing device 100 emphasizes a stereoscopic effect of the region to which the viewer pays attention by adjusting a disparity amount of the input image in accordance with a degree of attention of the viewer, and provides the stereoscopic image making a high realistic sensation. Note that, the input image is not limited to the stereoscopic image. The input image may be a multi-viewpoint image.

The degree-of-attention map generating unit 110 calculates a degree-of-attention map of the input image on the basis of an image characteristic feature of the input image such as contrast, a luminance level, colors (RGB), edge strength, and orientation of the edge. In the degree-of-attention map, information indicating the degree of attention of the viewer is added to each pixel of the input image. The degree-of-attention map generating unit 110 determines that the degree of attention is high in a case where the image has high contrast, in a case where the image has high luminance, in a case where the edge of the image has stationarity, in a case where the image has high spatial frequency, or the like. Note that, the case where the edge of the image has the stationarity falls under a case where the contrast and the luminance change with regularity and the edge represents an object such as face contours of a person. In addition, the contrast corresponds to amplitude of the spatial frequency. For example, in a case where there is a face of a person in the center of the image and a background has no feature, the face of the person in the center has a high degree of attention. As a method for calculating the degree-of-attention map, there can be used a method for calculating a saliency (attractiveness) map of the input image on the basis of a luminance level, colors (RGB), and an image characteristic feature of the input image, the image characteristic feature including edge strength, orientation of the edge, and the like. Alternatively, the degree-of-attention map generating unit 110 may find a motion vector of the image from the input image by using block matching or the like and may calculate a degree of attention from the motion vector. On the other hand, the degree-of-attention map generating unit 110 may consider motion vector information and calculate the degree-of-attention map.

Information on a disparity map is input to the degree-of-attention map statistical analysis unit 120. The disparity map information is information indicating disparity of each pixel in the input image. The degree-of-attention map statistical analysis unit 120 analyzes the degree-of-attention map that the degree-of-attention map generating unit 110 has calculated for each disparity amount of each pixel, and sets a weighting parameter for disparity having a high degree of attention. That is, the degree-of-attention map statistical analysis unit 120 statistically analyzes which area has disparity with high degree of attention (which area is easily-noticeable), and performs a weighting process on the basis of the analysis.

Figure 2:
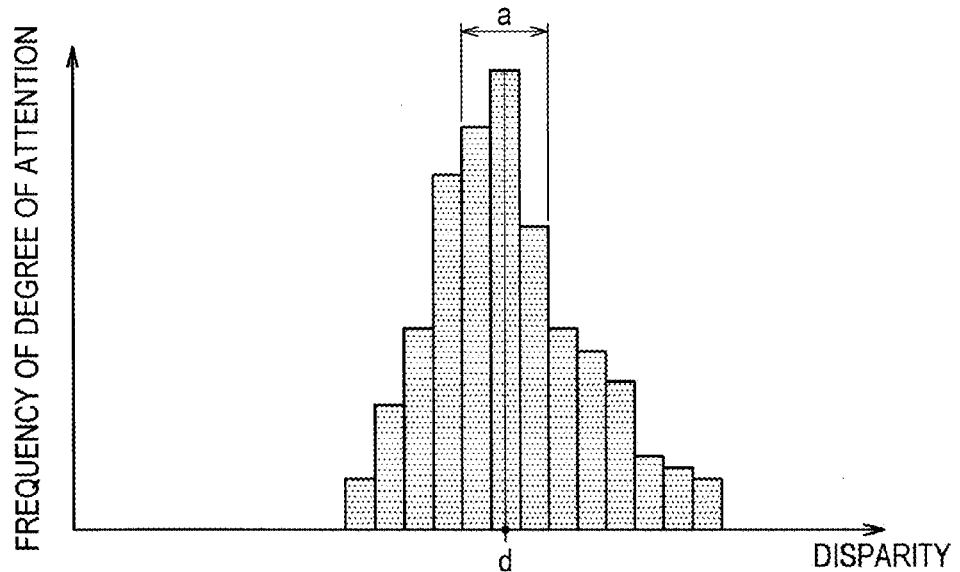
FIG. 2 is a schematic diagram showing a histogram formed by a degree-of-attention map statistical analysis unit, the histogram showing that a score of a degree of attention is accumulated with respect to each disparity amount.

FIG. 2 is a schematic diagram showing a histogram formed by the degree-of-attention map statistical analysis unit 120, the histogram showing that a score of a degree of attention of each pixel is accumulated with respect to each disparity amount. As shown in FIG. 2, the degree-of-attention map statistical analysis unit 120 forms a histogram showing a frequency of a degree of attention to disparity on the basis of information indicating disparity of each pixel and a degree of attention to each pixel. For example, in a case where there is a face of a person in the center of the image and a background has no feature, the face of the person in the center has a high degree of attention. Accordingly, a disparity value d of pixels corresponding to the face of the person has a high degree of attention (vertical axis in FIG. 2).

Subsequently, the degree-of-attention map statistical analysis unit 120 estimates a disparity area having a high degree of attention from a mode value of the histogram, and sets a weighting parameter. Specifically, since the disparity value d has the highest degree of attention in FIG. 2, the weighting parameter is set in a manner that an area a near the disparity value d is weighted high.

Figure 3:
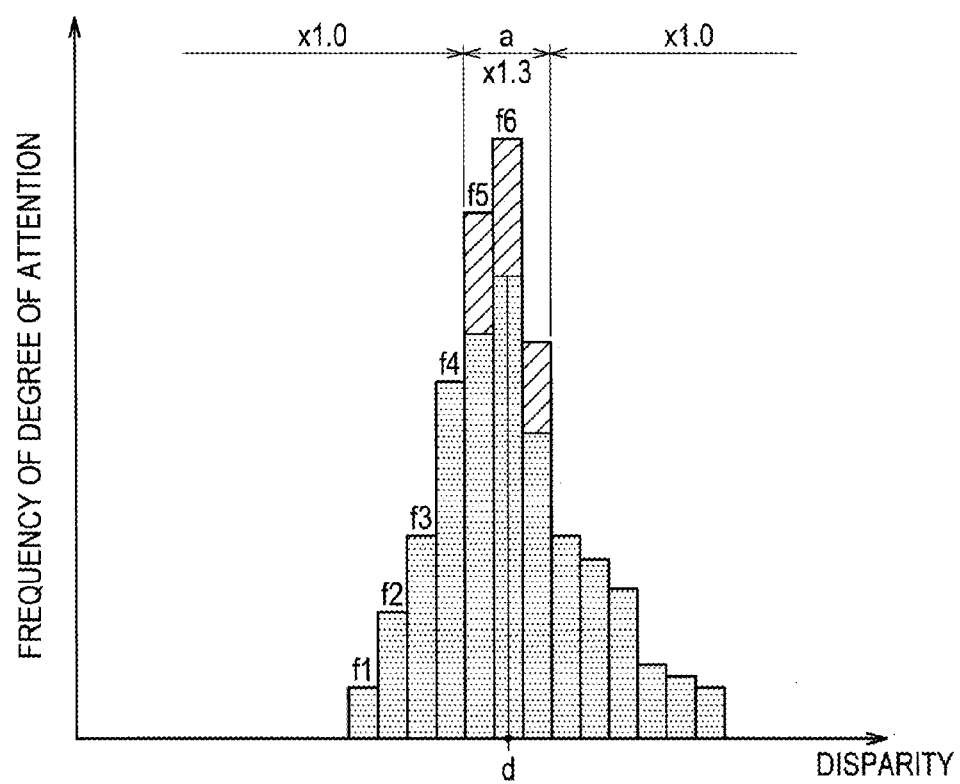
FIG. 3 is a schematic diagram showing a weighted disparity histogram formed by a disparity histogram forming unit.

The disparity histogram forming unit 130 forms a weighted disparity histogram by using a weighting parameter corresponding to the disparity analyzed by the degree-of-attention map statistical analysis unit 120. FIG. 3 is a schematic diagram showing a weighted disparity histogram formed by a disparity histogram forming unit 130. In a histogram shown in FIG. 3, frequencies in the area a near the disparity value d of FIG. 2 is increased by the weighting parameter (weighting coefficient (1.3 times)). In the area a in FIG. 3, diagonal hatched areas correspond to the increase caused by the weighting parameter. Outside of the area a near the disparity value d, a weighting parameter is set to 1.0. Accordingly, a histogram other than the area a is identical to FIG. 2. Note that, the weighting parameter other than the area a may be less than 1.0.

The conversion table generating unit 140 forms a disparity conversion table from a cumulative histogram based on the weighted disparity histogram shown in FIG. 3. The disparity conversion table can be formed in a way similar to the histogram smoothing (histogram equalization) which is used as a technology for enhancing contrast of an image. Subsequently, the conversion table generating unit 140 converts and outputs the disparity in the disparity map on the basis of the generated table.

1.2. Example of Disparity Conversion Table

Figure 4:
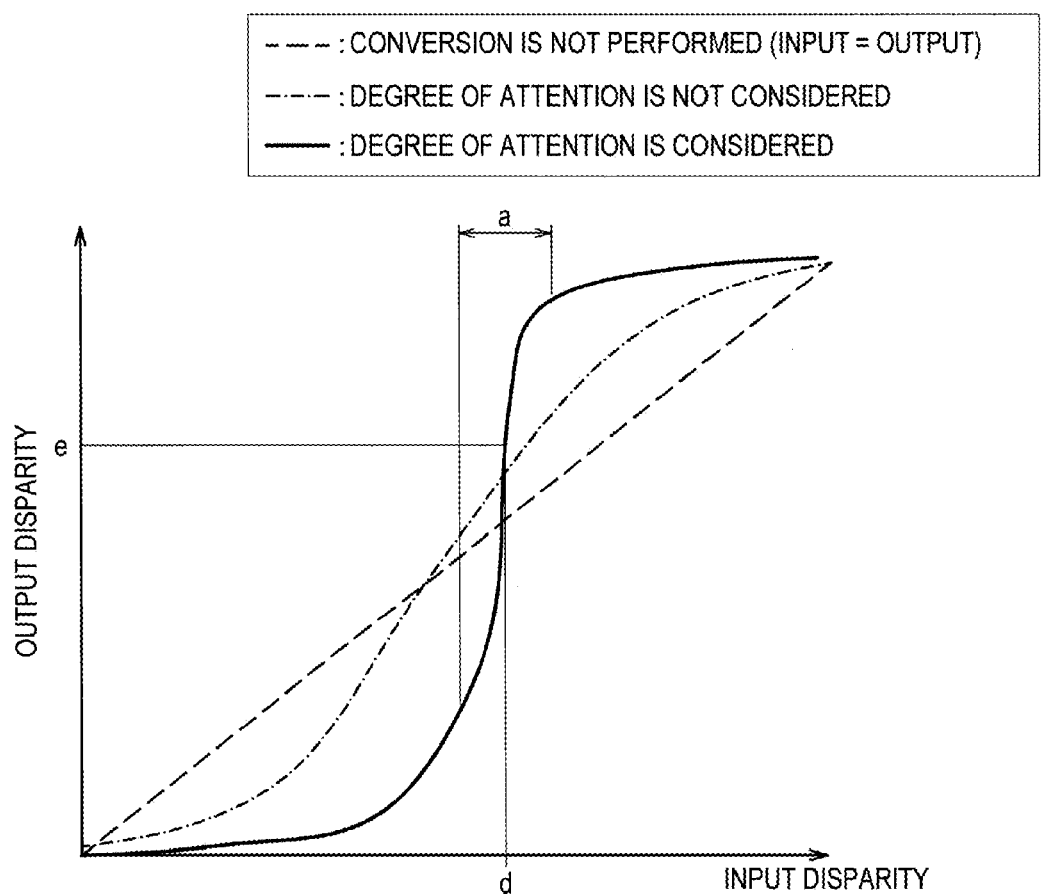
FIG. 4 is a schematic diagram showing a disparity conversion table formed by a conversion table generating unit.

FIG. 4 is a schematic diagram showing the disparity conversion table formed by the conversion table generating unit 140. The disparity conversion table defines relations between input disparity values (input disparity in horizontal axis) and output disparity values (output disparity). A characteristic of a solid line in the disparity conversion table shown in FIG. 4 is generated by associating frequencies with disparity values in the weighted disparity histogram shown in FIG. 3 and accumulating the frequencies. For example, a value of the output disparity e corresponding to the input disparity of the disparity value d is a value obtained by accumulating frequencies from the disparity value 0 to the disparity value d in FIG. 3. That is, the output disparity e=frequencies f1+f2+f3+f4+f5+f6.

In a similar way, a characteristic of a dashed-dotted line shown in FIG. 4 is generated by associating frequencies with disparity values in the histogram shown in FIG. 2 and accumulating the frequencies. The dashed-dotted line is shown to be compared with the characteristic of the solid line. In addition, a characteristic of a dashed line in FIG. 4 shows a case where the output disparity is output without performing conversion on the input disparity (input disparity=output disparity).

By comparing the characteristic of the solid line with the characteristic of the dashed-dotted line shown in FIG. 4, the solid line has a characteristic that a slope of the solid line becomes steeper than the dashed line in the area a, since the solid line is formed from the weighted disparity histogram in which frequencies in the area a has been increased by the weighting parameter.

Disparity values of the disparity map are input to the conversion table generating unit 140. The conversion table generating unit 140 converts the input disparity values (input disparity) by using the characteristic of the solid line in FIG. 4, and outputs the converted disparity values as the output disparity. Accordingly, the characteristic of the solid line becomes steep by weighting is performed by the weighting parameter in the area a near the disparity value d having a high degree of attention. That is, the output disparity corresponding to the input disparity increases more than the characteristics of the dashed-dotted line or the dashed line. Accordingly, the disparity values of the pixels having the high degree of attention increase, and it is possible to emphasize a stereoscopic effect of the region having the high degree of attention.

In a case where a stereoscopic image is recognized with naked eyes, slits are provided on a display, and images for the left eye and images for the right eye are viewed by the left eye and the right eye of the viewer, respectively. In the case of such stereoscopic display for the naked eyes, crosstalk occurs. Accordingly, there is a limit to increase a disparity value. Accordingly, a disparity value of an area to which the viewer pays much attention increases, and it is possible to minimally suppress the crosstalk and to emphasize a stereoscopic effect. In a similar way, in a case of stereoscopic image display by using glasses, the viewer wears shutter glasses, and images for the left eye and images for right eye are viewed by the left eye and the right eye of the viewer, respectively. In the case of such stereoscopic display using the shutter glasses, a negative effect (so-called 3D sickness) may occur, the examples of the negative effect including that the viewer is offended by stereoscopic display when a disparity value increases. Accordingly, a disparity value of an area to which the viewer pays much attention increases, and it is possible to emphasize a stereoscopic effect without offending the viewer.

According to the present embodiment, disparity is adjusted in accordance with a degree of attention of a viewer. However, another parameter may changes in accordance with the degree of attention. For example, another parameter of the pixels can be changed in accordance with a degree of attention. The examples of the another parameter include contrast, a spatial frequency, hue, or colorfulness of the image.

1.3. Example of Degree-of-Attention Histogram Having a Plurality of Maxima

Figure 5:
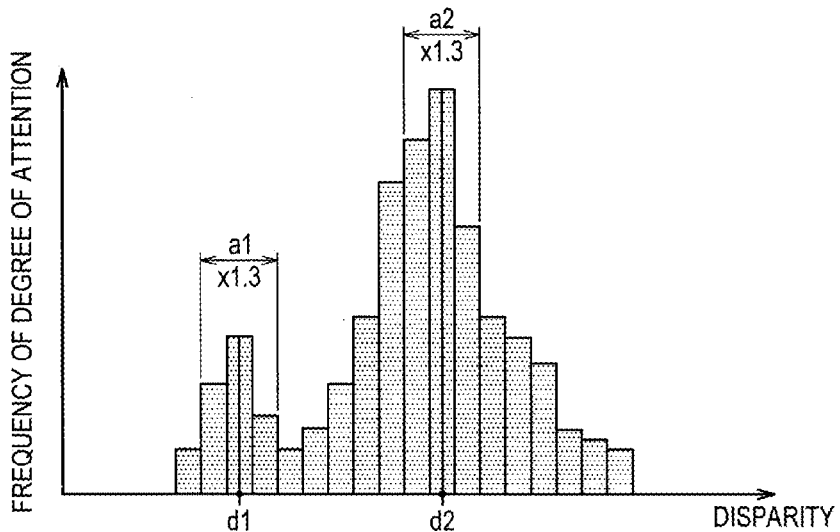
FIG. 5 is a schematic diagram showing a histogram formed by a degree-of-attention map statistical analysis unit, the histogram showing that a score of a degree of attention is accumulated with respect to each disparity amount in a case where the histogram has two maxima.
Figure 6:
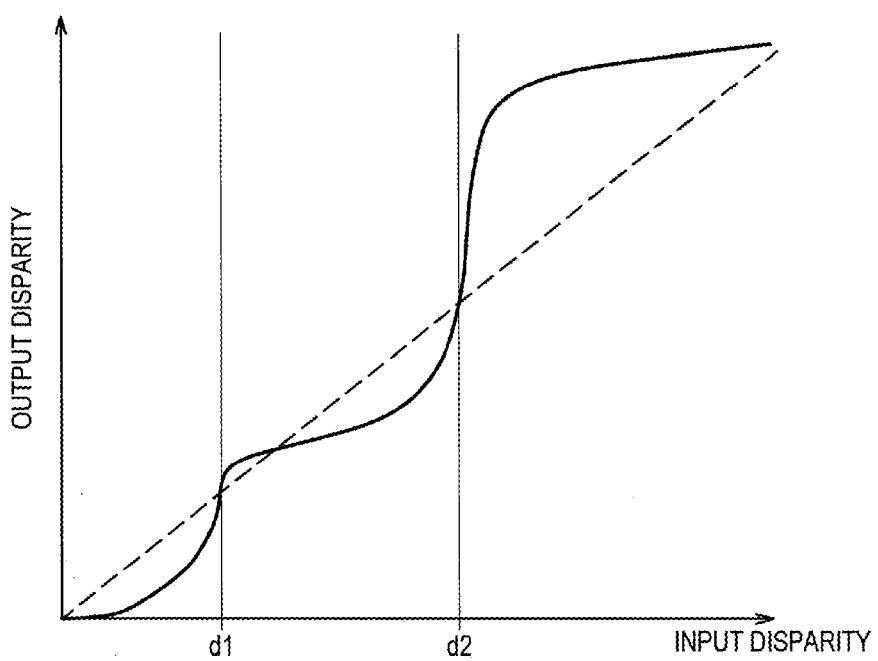
FIG. 6 is a schematic diagram showing a disparity conversion table formed by a conversion table generating unit.

FIG. 5 is a schematic diagram showing a histogram formed by a degree-of-attention map statistical analysis unit 120, the histogram showing that a score of a degree of attention is accumulated with respect to each disparity amount in a case where the histogram has two maxima. As shown in FIG. 5, in a case where a histogram has a plurality of maxima, the plurality of maxima are detected from the histogram in order of frequency, and weighting parameters are set in a plurality of disparity areas. According to the example shown in FIG. 5, weighting parameters are set to 1.3 in areas a1 and a2 centered around disparity values d1 and d2 corresponding to the two maxima. In the other areas, weighting parameters are set to 1.0 (or equal to or less than 1.0). Accordingly, a weighted disparity histogram is generated in a way similar to FIG. 3. Subsequently, a disparity conversion table represented by a characteristic of a solid line in FIG. 6 is generated by accumulating frequencies of the generated weighted disparity histogram in association with increase in disparity value. Alternatively, a motion vector is detected from an image, and priority is set in a disparity area which the viewer wants to zoom in, in accordance with motion amount.

Accordingly, a disparity value of each pixel is converted by using the conversion table in FIG. 6, and it is possible to emphasize disparity in a plurality of regions having high degrees of attention. In addition, in a way similar to FIG. 4, a characteristic of a dashed line in FIG. 6 shows a case where the output disparity is output without performing conversion on the input disparity.

As explained above, according to the first embodiment, disparity values are converted in view of degrees of attention in the input image in a manner that a disparity value increases as a pixel has a higher degree of attention. Accordingly, the disparity values of the pixels having the high degree of attention increase, and it is possible to emphasize a stereoscopic effect of the region having a high degree of attention. That is, bias of disparity distribution of content is reduced by performing disparity conversion according to a degree of attention of a viewer even if the disparity distribution of the content is biased toward a display surface. Accordingly, the viewer can enjoy a video whose stereoscopic effect has been enhanced in accordance with the degree of attention. Since the disparity conversion table in which the degree of attention of the image has been reflected is formed, a disparity amount increases in an area to which the viewer tends to pay attention. Accordingly, the viewer can feel comfortable when viewing a stereoscopic video.

2. Second Embodiment

Next, a second embodiment of the present disclosure is explained. In the first embodiment, a degree of attention of an input image is determined by analyzing the input image. On the other hand, in the second embodiment, a degree of attention of an input image is determined from a direction of gaze of a viewer.

2.1. Configuration Example of Image Processing Device

Figure 7:
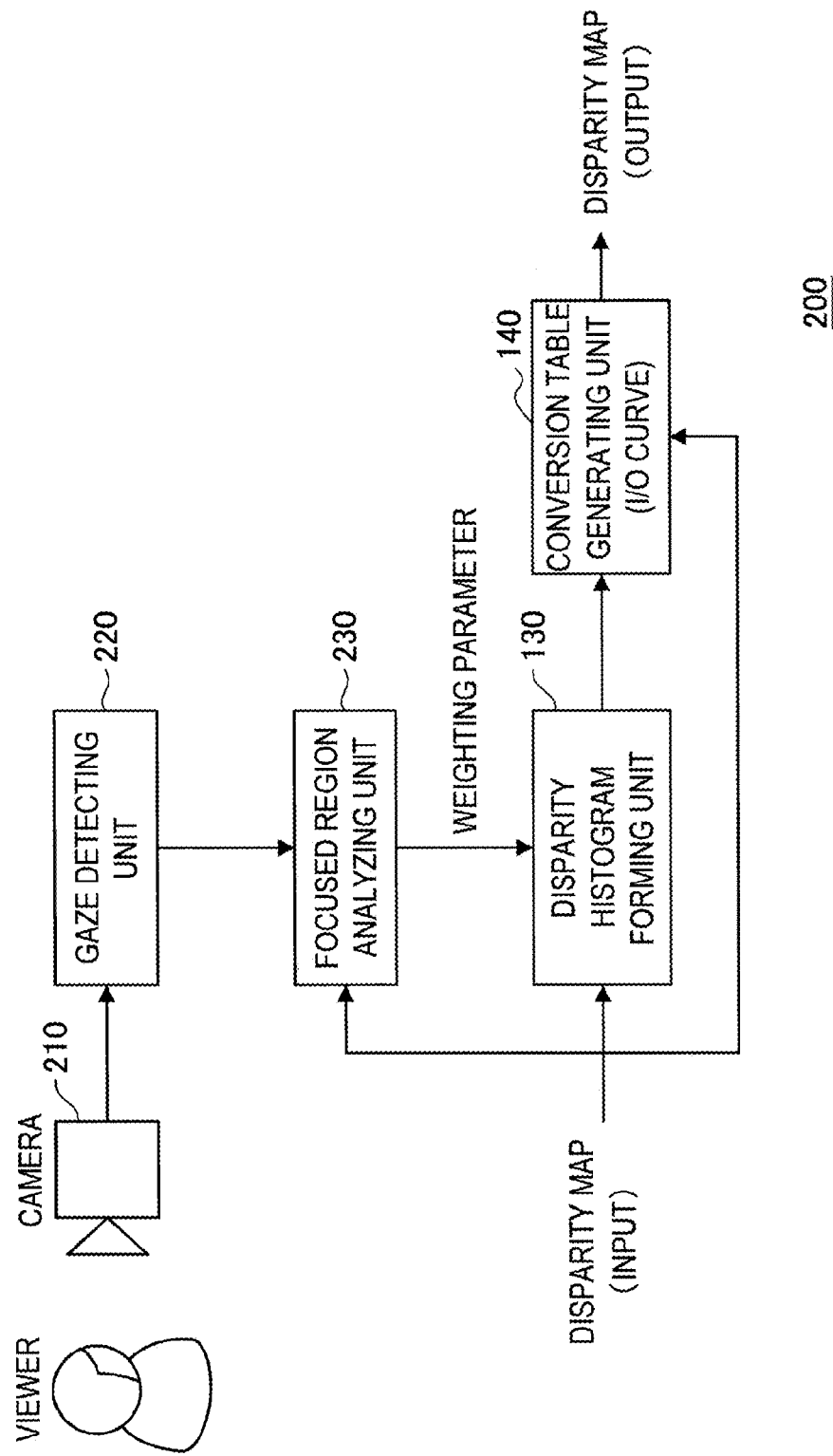
FIG. 7 is a schematic diagram showing a configuration of an image processing device according to a second embodiment.

FIG. 7 is a schematic diagram showing a configuration of an image processing device 200 according to the second embodiment. As shown in FIG. 7, the image processing device 200 according to the second embodiment includes a camera 210, a gaze detecting unit 220, a focused region analyzing unit 230, a disparity histogram forming unit 130, and a conversion table generating unit 140. In FIG. 7, the configurations of the disparity histogram forming unit 130 and the conversion table generating unit 140 are basically the same as the first embodiment.

The camera 210 shoots a face of a viewer, especially eyes of the viewer. The gaze detecting unit 220 detects a direction of gaze of the viewer from an image shot by the camera 210. The focused region analyzing unit 230 detects position information of a region to which the viewer pays attention in an input image from the direction of gaze of the viewer detected by the gaze detecting unit 220, analyzes a disparity map of each pixel in the region, and generates a histogram in which scores of the degree of attention of the viewer are accumulated on a disparity amount basis. This histogram is generated in a way similar to the histogram shown in FIG. 2 that has been explained in the first embodiment. Subsequently, the focused region analyzing unit 230 sets a weighting parameter to the disparity histogram in a manner that a disparity value near the area a which is disparity of a focused region increases. The setting of weighting parameter is performed in a way similar to the first embodiment.

Processes performed by the disparity histogram forming unit 130 and the conversion table generating unit 140 are similar to the first embodiment. The disparity histogram forming unit 130 forms a weighted disparity histogram by using a weighting parameter corresponding to the disparity analyzed by the focused region analyzing unit 230. For example, in a way similar to the first embodiment, a frequency of a histogram in an area a including a disparity value d of an image position to which the viewer pays attention is multiplied by gain so as to increase the frequency, and the weighted disparity histogram is formed. The conversion table generating unit 140 forms a disparity conversion table from a cumulative histogram of the weighted disparity histogram.

Accordingly, in the weighted disparity histogram generated by the conversion table generating unit 140, disparity in a focused region corresponding to a gaze of the viewer is increased by a weighting parameter. Accordingly, it is possible to emphasize a stereoscopic effect of the focused region found from the gaze of the viewer.

As explained above, according to the second embodiment, a degree of attention of each pixel is determined on the basis of a direction of gaze of a viewer. In a way similar to the first embodiment, a disparity value in an area having a high degree of attention is increased by a weighting parameter. Accordingly, it is possible to emphasize a stereoscopic effect of the image region having the high degree of attention.

3. Third Embodiment

3.1. Configuration Example of Image Processing Device

Figure 8:
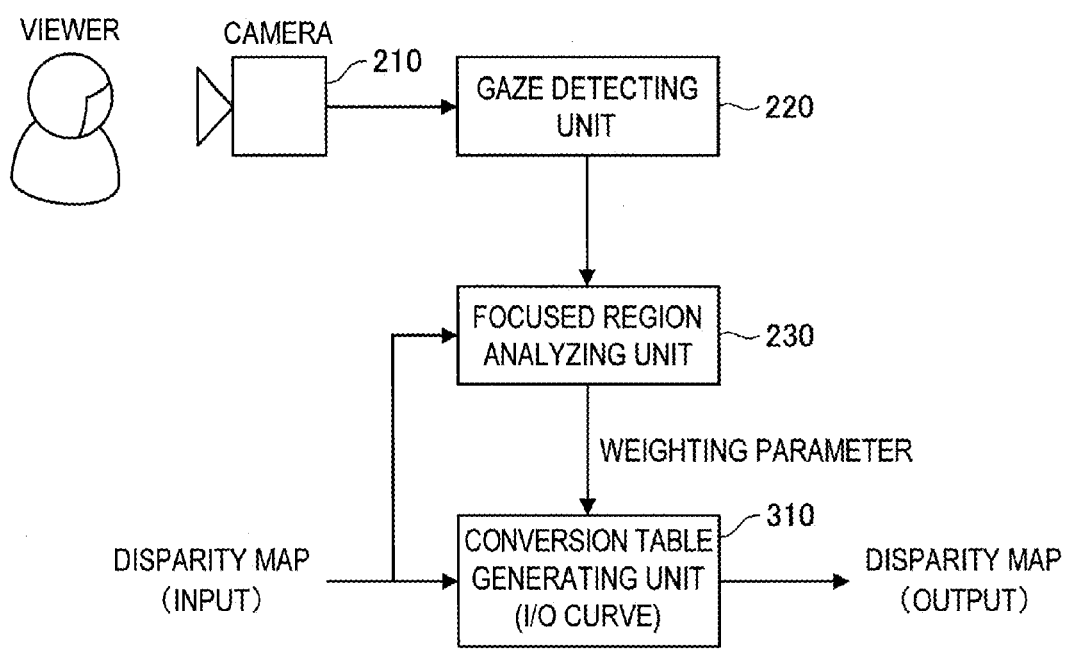
FIG. 8 is a schematic diagram showing a configuration of an image processing device according to a third embodiment.

Next, a third embodiment of the present disclosure is explained. FIG. 8 is a schematic diagram showing a configuration of an image processing device according to a third embodiment. As shown in FIG. 8, an image processing device 300 according to the third embodiment includes a camera 210, a gaze detecting unit 220, a focused region analyzing unit 230, and a conversion table generating unit 310.

In a way similar to the second embodiment, the gaze detecting unit 220 detects a direction of gaze of the viewer from an image shot by the camera 210. The focused region analyzing unit 230 detects position information of a region to which the viewer pays attention in an input image from the direction of gaze of the viewer detected by the gaze detecting unit 220, analyzes a disparity map of each pixel at a position of the region, and generates a histogram in which scores of the degree of attention of the viewer are accumulated on a disparity amount basis. This histogram is generated in a way similar to the histogram shown in FIG. 2 that has been explained in the first embodiment. Subsequently, the focused region analyzing unit 230 sets a weighting parameter to the disparity histogram in a manner that a disparity value of the area a including a vicinity of the disparity value d of a focused region increases.

3.2. Example of Disparity Conversion Table

Figure 9:
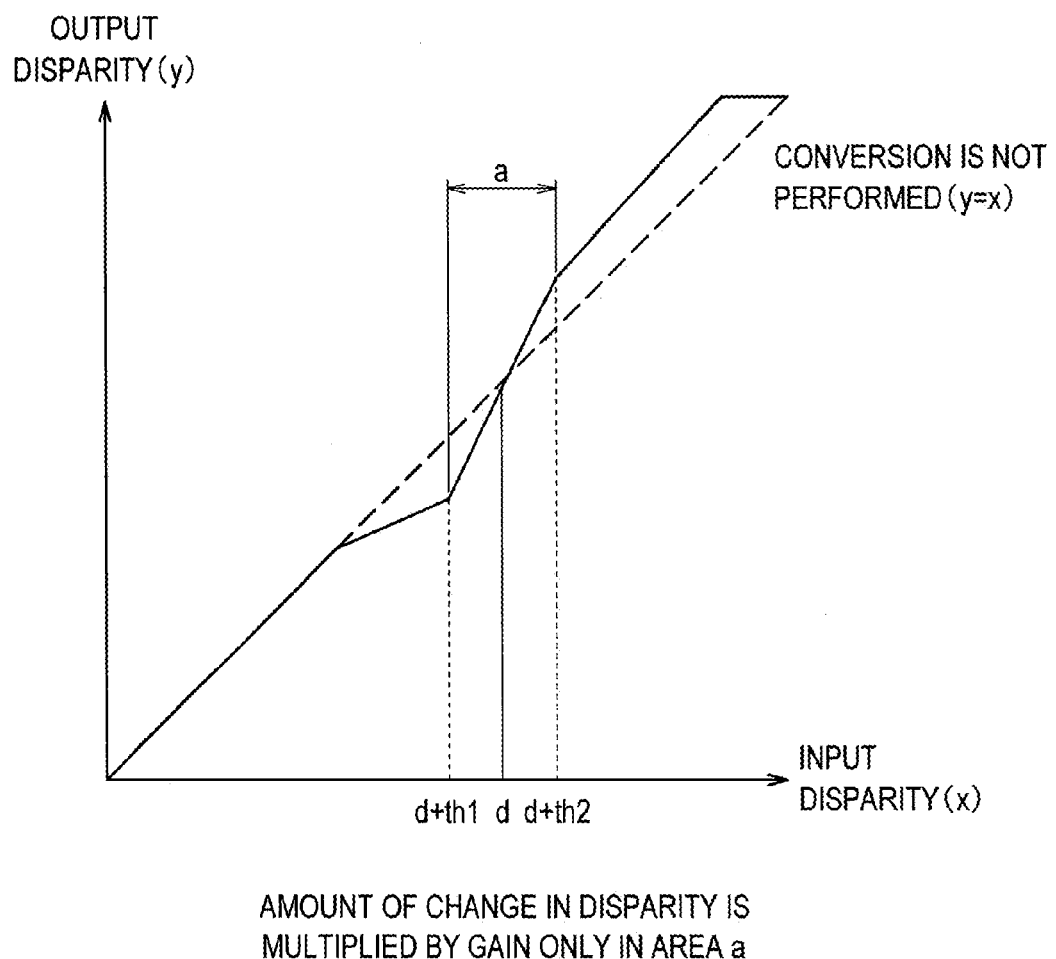
FIG. 9 is a schematic diagram showing a conversion table generated by a conversion table generating unit according to the third embodiment.

The conversion table generating unit 310 generates a conversion table by using the weighting parameter set by the focused region analyzing unit 230. FIG. 9 is a schematic diagram showing a conversion table generated by the conversion table generating unit 310 according to the third embodiment. On the basis of the weighting parameter, the conversion table generating unit 310 multiplies an amount of change in output disparity corresponding to input disparity by gain, and increase the output disparity relative to the input disparity in an area a (from d+th1 to d+th2) near a disparity value d where a degree of attention becomes maximum in the histogram formed by the focused region analyzing unit 230. Accordingly, it is possible to generate the conversion table shown in FIG. 9 without forming the weighted disparity histogram.

As described above, the conversion table is formed from the weighted disparity histogram by using histogram equalization in the first and second embodiments. As shown in FIG. 9, according to the third embodiment, a conversion table can be generated by multiplying a slope of a characteristic (dashed line) indicating input disparity=output disparity by a coefficient and causing the slope to be steep in the area a. Accordingly, generation of the conversion table can be performed more simply. Alternatively, it is also possible to form the conversion table by using a mathematical curve function (for example, sigmoid function) or a lookup table.

3.3. Configuration Example of Electronic Device

Figure 10:
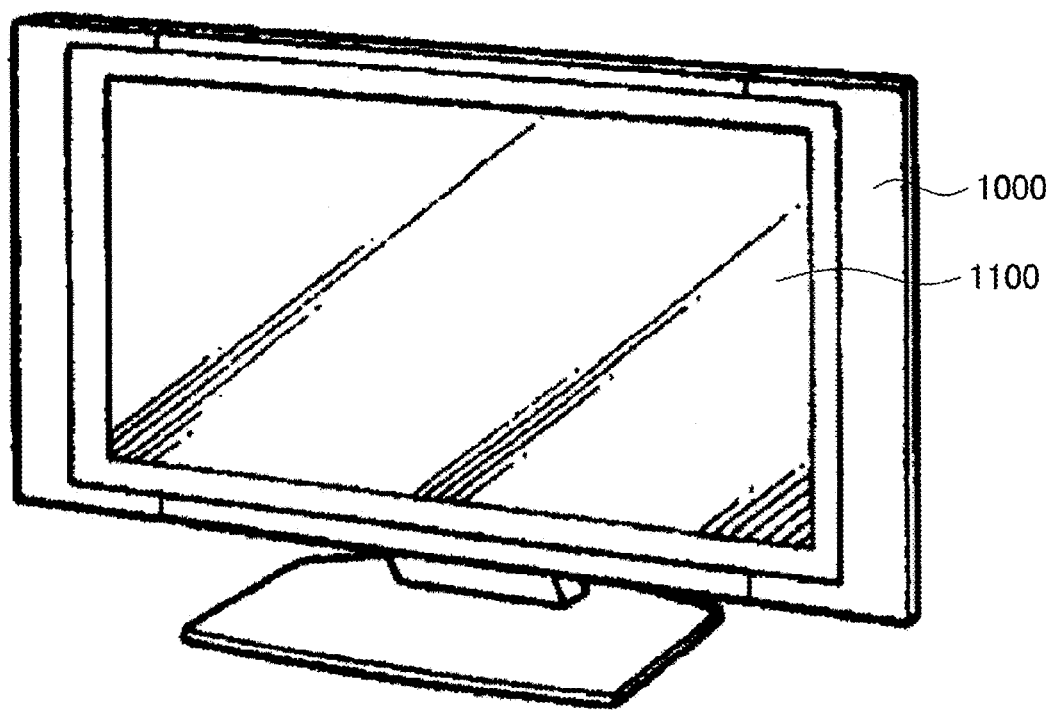
FIG. 10 is a schematic diagram showing an electronic device.

The input image is displayed by a display unit 1100 of an electronic device 1000 such as a liquid crystal display (LCD) device shown in FIG. 10, by using a disparity value processed by the image processing device 100 according to any embodiment of the present disclosure. The electronic device 1000 according to the present embodiment includes the image processing device 100 and the display unit 1100. The electronic device 1000 may be a television receiver, a digital camera, or a mobile device such as a cell phone or a smartphone, for example. By displaying the input image on which image processing has been performed by the image processing device 100 on the display unit, it is possible to minimally suppress occurrence of the crosstalk while maximizing disparity display performance.

It should be understood by those skilled in the art that various modifications, combinations, sub-combinations and alterations may occur depending on design requirements and other factors insofar as they are within the scope of the appended claims or the equivalents thereof.

Furthermore, the advantages discussed in this specification are only intended for illustrative and exemplary purposes and are not limitative. In other words, in addition to or in place of the above-described advantages, the technology according to the embodiments of the present disclosure may exhibit other advantages that are obvious to a skilled person from the specification.

Additionally, the present technology may also be configured as below.

(1) An image processing method including:
  acquiring a degree of attention of a viewer to a stereoscopic input image;
  acquiring a relation between the degree of attention and a disparity value for stereovision from each pixel of the input image; and
  weighting a disparity value of a pixel having the high degree of attention on the basis of the relation between the degree of attention and the disparity value, and increasing the disparity value of the pixel having the high degree of attention.

(2) The image processing method according to (1), wherein
  a conversion table is generated for converting an input disparity value into an output disparity value by the weighting, and the disparity value of the pixel having the high degree of attention is increased in accordance with the conversion table.

(3) The image processing method according to (2), wherein
  a histogram of the degree of attention depending on the disparity value is acquired as the relation between the degree of attention and the disparity value.

(4) The image processing method according to (3), wherein
  a weighted histogram is generated by performing the weighting in an area including a disparity value having the peak degree of attention and by multiplying the degree of attention in the area by gain in the histogram, and
  the conversion table is generated by performing histogram equalization on the weighted histogram.

(5) The image processing method according to (3), wherein
  the weighting is performed by increasing a slope of the output disparity value to the input disparity value in the conversion table, with regard to an area including a disparity value having the peak degree of attention in the histogram.

(6) The image processing method according to (1), wherein
  the degree of attention of the viewer to the input image is acquired on the basis of an image characteristic feature of the input image.

(7) The image processing method according to (1), wherein
  the degree of attention of the viewer to the input image is acquired on the basis of a direction of gaze of the viewer who views the input image.

(8) An image processing device including:
  a degree-of-attention acquiring unit configured to acquire a degree of attention of a viewer to a stereoscopic input image;
  an analysis unit configured to acquire a relation between the degree of attention and a disparity value for stereovision from each pixel of the input image; and
  a disparity increasing unit configured to weight a disparity value of a pixel having the high degree of attention on the basis of the relation between the degree of attention and the disparity value, and configured to increase the disparity value of the pixel having the highest degree of attention.

(9) An electronic device including:
  a degree-of-attention acquiring unit configured to acquire a degree of attention of a viewer to a stereoscopic input image;
  an analysis unit configured to acquire a relation between the degree of attention and a disparity value for stereovision from each pixel of the input image;
  a disparity increasing unit configured to weight a disparity value of a pixel having the high degree of attention on the basis of the relation between the degree of attention and the disparity value, and configured to increase the disparity value of the pixel having the highest degree of attention; and
  a display unit configured to display a stereoscopic image on the basis of the disparity value increased by the disparity increasing unit.

What is claimed is:
1. An image processing method comprising:
  generating a degree-of-attention map for a stereoscopic input image;
  generating a histogram of a degree of attention to the input image and a disparity value for stereovision from each pixel of the input image based on the degree-of-attention map and a disparity map of the input image;
  weighting, in the histogram, a disparity value of at least one pixel having a high degree of attention to form a weighted histogram, wherein the disparity value of the at least one pixel is increased in an area near the disparity value having the high degree of attention and is held constant or decreased outside the area near the disparity value having the high degree of attention; and
  generating a conversion table for converting an input disparity value for the input image into an output disparity value based on the weighted histogram.

2. The image processing method according to claim 1, wherein, the conversion table is generated by performing histogram equalization on the weighted histogram.

3. The image processing method according to claim 1, wherein the weighting is performed by increasing a slope of the output disparity value to the input disparity value in the conversion table, with regard to an area including a disparity value having the peak degree of attention in the histogram.

4. The image processing method according to claim 1, wherein the degree of attention to the input image is acquired on the basis of an image characteristic feature of the input image.

5. The image processing method to claim 1, wherein the degree of attention to the input image is acquired on the basis of a direction of gaze of the viewer who views the input image.

6. An image processing device comprising:
a processor configured to perform a process comprising:
generating a degree-of-attention map for a stereoscopic input image;
generating a histogram of a degree of attention to the input image and a disparity value for stereovision from each pixel of the input image based on the degree-of-attention map and a disparity map of the input image;
weighting, in the histogram, a disparity value of at least one pixel having a high degree of attention to form a weighted histogram, wherein the disparity value of the at least one pixel is increased in an area near the disparity value having the high degree of attention and is held constant or decreased outside the area near the disparity value having the high degree of attention; and
generating a conversion table for converting an input disparity value for the input image into an output disparity value based on the weighted histogram.

7. An electronic device comprising:
a processor configured to perform a process comprising:
generating a degree-of-attention map for a stereoscopic input image;
generating a histogram of a degree of attention to the input image and a disparity value for stereovision from each pixel of the input image based on the degree of attention map and a disparity map of the input image;
weighting, in the histogram, a disparity value of at least one pixel having a high degree of attention to form a weighted histogram, wherein the disparity value of the at least one pixel is increased in an area near the disparity value having the high degree of attention and is held constant or decreased outside the area near the disparity value having the high degree of attention;
generating a conversion table for converting an input disparity value of the input image into an output disparity value based on the weighted histogram; and
a display unit configured to display a stereoscopic image on the basis of the output disparity value.

* * * * *